(12) United States Patent     (10) Patent No.:   US 12,634,131 B2

Soler Garrido et al.     (45) Date of Patent:    May 19, 2026

(54) AI MODULE AND METHOD FOR SECURELY OPERATING AN INDUSTRIAL CONTROL DEVICE

(71) Applicant: Siemens Aktiengesellschaft, Munich (DE)

(72) Inventors: Josep Soler Garrido, Seville (ES); Ingo Thon, Grasbrunn (DE); René Fischer, Limbach-Oberfrohna (DE); Johannes Frank, Meerbusch (DE); Alexander Kessler, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 76 days.

(21) Appl. No.: 18/686,691

(22) PCT Filed: Aug. 18, 2022

(86) PCT No.: PCT/EP2022/073027

§ 371 (c)(1),
(2) Date: Feb. 26, 2024

(87) PCT Pub. No.: WO2023/025642

PCT Pub. Date: Mar. 2, 2023

(65)      Prior Publication Data

US 2024/0291654 A1    Aug. 29, 2024

(30)      Foreign Application Priority Data

Aug. 27, 2021   (EP) .................................... 21193450

(51) Int. Cl.
*H04L 9/14*      (2006.01)
*G06F 21/64*     (2013.01)
*H04L 9/32*      (2006.01)

(52) U.S. Cl.
CPC .............. *H04L 9/14* (2013.01); *H04L 9/3247* (2013.01)

(58) Field of Classification Search
CPC .......... H04L 9/14; H04L 9/3247; G06F 21/64
See application file for complete search history.

(56)      References Cited

U.S. PATENT DOCUMENTS

| | | | |
|---|---|---|---|
| 11,245,517 B1* | 2/2022 | Tsarfati | ................. H04L 9/0822 |
| 2005/0283826 A1* | 12/2005 | Tahan | ................... G06F 21/575 |
| | | | 726/2 |
| 2008/0155272 A1 | 6/2008 | Kawaguchi | |
| 2012/0066493 A1* | 3/2012 | Widergren | .......... H04L 63/0428 |
| | | | 713/160 |
| 2015/0052352 A1* | 2/2015 | Dolev | ................... H04L 9/3278 |
| | | | 713/156 |
| 2020/0134230 A1* | 4/2020 | Booth, Jr. | .......... G06F 21/6245 |
| 2021/0263493 A1 | 8/2021 | Claussen | |
| 2022/0019200 A1 | 1/2022 | Drews et al. | |

FOREIGN PATENT DOCUMENTS

| | | |
|---|---|---|
| EP | 3657277 | 5/2020 |
| EP | 3916599 | 12/2021 |

OTHER PUBLICATIONS

PCT International Search Report dated Dec. 6, 2022 based on PCT/EP2022/073027 filed Aug. 18, 2022.

\* cited by examiner

*Primary Examiner* — Shirley X Zhang

(74) *Attorney, Agent, or Firm* — Cozen O'Connor

(57)      ABSTRACT

A method for securely operating an industrial control device together with an AI module for processing at least one AI data set via a two-stage decryption method.

16 Claims, 4 Drawing Sheets

AI MODULE AND METHOD FOR SECURELY OPERATING AN INDUSTRIAL CONTROL DEVICE

CROSS-REFERENCE TO RELATED APPLICATIONS

This is a U.S. national stage of application No. PCT/EP2022/073027 filed 18 Aug. 2022. Priority is claimed on European Application No. 21193450.0 filed 27 Aug. 2021, the content of which is incorporated herein by reference in its entirety.

BACKGROUND OF THE INVENTION

1. Field of the Invention

The invention relates to a method for securely operating an industrial control device together with an AI module for processing at least one AI data set via a two-stage decryption method, and to a device for executing an industrial automation program using an AI data set.

2. Description of the Related Art

In many fields of application in industrial automation, methods, algorithms or models based on artificial intelligence (AI) or machine learning are intended to be integrated in industrial automation processes. Such AI methods or AI enhancements often contain a multiplicity of data items worth protecting, such as know-how relating to industrial processes, and/or intellectual property for models. In addition to the attempt to protect such data from being copied or imitated, in particular to license AI models or AI algorithms or generally AI applications and to protect them from unauthorized use, there is also interest in protecting legitimately used software from cyber attacks.

US Pub. No. 2021/0263493 A1 describes a controller system having a CPU and technology modules comprising an AI acceleration processor that uses an AI method.

SUMMARY OF THE INVENTION

Against this background, it is an object of the present invention to increase protection when using AI data sets in an industrial automation environment by implementing coupling to specific hardware upon which the AI is executed.

This and other objects and advantages are achieved in accordance with the invention by a method for securely operating an industrial control device together with an AI module for processing at least one AI data set, in particular an artificial-intelligence-based model or an artificial-intelligence-based application.

The AI data set is decrypted on the AI module at the runtime of the industrial control device via a two-stage decryption method using a cryptographic module decryption key of a cryptographic module key pair, which is provided by a module manufacturer unit of the AI model, and using a cryptographic AI decryption key of a cryptographic AI key pair, which is decrypted via the cryptographic module decryption key, and is executed in decrypted form, and the module manufacturer unit generates a signature key pair having a public signature key and a private signature key and provides the AI module with the public signature key, and a hardware characteristic is created by the module manufacturer unit as a module fingerprint data set and is signed with the private signature key and is made available to the AI development unit as a signed module-specific token.

The AI module is distinguished by the fact that a separate processor is provided that is independent of the processor of the industrial control device, such as a PLC. Here, the AI module may be formed as independent hardware or may be integrated in the hardware of the industrial control device. For example, the AI module may be installed as a physical module, in addition to the controller, on a top-hat rail. The AI module may also be installed as a plug-in module in existing control units.

The AI module forms its own logic circuit, separate from the controller, with its own processor, an AI processing unit and its own memories. The AI module receives input data from the controller and/or from further components of the automation system, such as sensors. The AI module delivers output data to the controller and/or directly to further components of the automation system, such as valves or the like.

The AI module is used to process the AI data set. This is, for example, an AI algorithm, an AI model or generally an AI application. The AI application implements text or voice or pattern recognition, for example, in order to provide an instruction set therefrom for the industrial controller based on the AI algorithm or AI model. The AI-based method is performed at runtime by the industrial controller together with the AI module. For this purpose, the AI data set is processed on the AI module at runtime. The AI-based data set is available on the AI module for this, but is protected using a two-stage security method.

The AI data set is present in encrypted form in a memory of the AI module. For this purpose, it was encrypted using a cryptographic AI encryption key of a cryptographic AI key pair and was made available to the AI module in encrypted form and was stored in the memory of the AI module. However, the associated AI decryption key, which makes it possible to decrypt the AI data set, is not directly present on the AI module. Instead, it is made available to the AI module, again only in encrypted form. For this purpose, the AI decryption key was encrypted using a cryptographic module encryption key of a cryptographic module key pair and was made available to the industrial controller in encrypted form.

The cryptographic AI key pair is preferably provided by an AI development unit, which sells the AI data set separately as a product, for example, and in particular is preferably also generated by the AI development unit. The module encryption key is also available to this unit. The industrial controller provides the AI module with the encrypted AI encryption key and the AI module decrypts it using the module decryption key. This module decryption key is available on the AI module and is preferably protected from access using further security measures.

The cryptographic module key pair is preferably generated by a module manufacturer, for example, by a module manufacturer unit that also generates the firmware for the AI module and makes it available to the AI module. For example, a development or configuration environment is provided for the purpose of setting up the AI module.

For example, during booting, the AI module reads its firmware from the non-volatile memory and loads it into the main memory, such as a RAM memory. In this step, the module decryption key is simultaneously extracted from the non-volatile memory, for example, and is likewise stored, for example, in the main memory or in a module-internal memory, such as an internal SRAM memory.

The industrial controller, which ultimately controls the execution of the AI application, provides the AI module, for example, with the AI decryption key that was encrypted and therefore secured using the module encryption key. For example, the AI processor of the AI module is provided with the secured cryptographic AI decryption key. A backplane bus that connects the industrial controller and the AI module is used for this purpose, for example. Communication protocols based on Profinet or Modbus are used, for example. Furthermore, other networks, in combination with the AI module, for example, provided with a connection for industrial communication, can be used for communication. A special communication chip is provided on the AI module for communication.

The AI decryption key is initially decrypted on the AI module using the module decryption key. This is performed, for example, by an AI processor of the AI module. The AI data set is then decrypted using the decrypted AI decryption key. This is also performed by the AI processor, for example. The decrypted AI data set is loaded into the main memory and executed, for example.

The disclosed method has the advantageous effect that the AI data set cannot be accessed if only the content of the AI module, with its storage areas, is known. Only the interaction of the AI module with the industrial controller results in decryption and therefore, for example, reading being possible. Therefore, the legitimate and desired access by a user of the controller with the AI module is enabled with little effort, on the one hand, because the AI module is used together with the controller for the AI automation task anyway. On the other hand, unwanted access to the AI data set, even though it is already available on the AI module in encrypted form, is prevented, because the module decryption key stored on the AI module is not suitable for decrypting the AI data set.

At the same time, the availability of the encrypted AI data set on the industrial controller or an engineering system for setting up the industrial controller is not critical either, because the appropriate AI decryption key is present only in encrypted form and can only be decrypted with knowledge of the module decryption key available on the AI module.

This advantageously means that an AI application that uses the AI data set can be used only on the combination of controller and AI module provided for this purpose.

Developers of AI applications who often market their products independently of the AI module manufacturer can use the disclosed method, in collaboration with the AI module manufacturer, to ensure that their products can be used only by the user of the industrial controller to whom they sell the AI product, for example, even if there is access to a memory card of the AI module and the AI data set is already stored there. It is therefore possible to protect the know-how and the sensitive AI data set or to have a licensing model independently of the protection provided by a device manufacturer of the AI module or the controller.

AI device manufacturers also have an option to restrict the use of their products to the combination with AI products from selected AI developers.

In addition, there is advantageously no need for a special cryptographic protection mechanism on the industrial control device. Complicated solutions such as Trusted Platform Modules (TPMs), or USB dongles for implementing a licensing model with a user of the controller are dispensed with.

The automation program running on the controller is coupled to the application running on the AI module via the disclosed method. Therefore, the system is overall less susceptible to faults caused by an AI application that is not expected by the PLC program.

At the same time, security facilities for protecting know-how or for the licensed use of software or the like, which are already provided on a controller, can remain unchanged and are not impaired by the proposed additional security layer. Therefore, the disclosed method can be combined, for example, with certificate managers that are provided on a PLC and ensure legitimate use of the PLC-completely independently of the AI module.

In accordance with an embodiment, the AI module is also provided with module firmware by the module manufacturer unit. The firmware is advantageously created and stored on a station in a programming language, is compiled into a firmware program and is stored as an executable file on the AI module.

In accordance with another embodiment, the cryptographic module decryption key and/or the firmware is/are stored in a non-volatile memory of the AI module. For example, a flash memory is used. For example, the AI module manufacturer stores an initial version of the firmware on the device, which initial version can be subsequently updated, for example, via updated firmware images that can be downloaded by a user of the AI module. For example, the firmware code is received by the processor of the AI module during booting via a serial interface, a Serial Peripheral Interface, SPI for short.

In accordance with a further embodiment, the cryptographic module decryption key stored in the non-volatile memory and/or the stored firmware is/are stored in a secured manner via a trusted computing method, in particular a secure boot method. The content of a non-volatile memory can be easily read. As a result, the data in the memory and, in particular, the firmware and cryptographic key material are secured. Here, use is preferably made of secure boot methods that use signature mechanisms to check whether the parts of the software that are used by the AI module for booting are trusted or whether their signatures can be verified. Furthermore, secure firmware update processes are advantageous, for which use is made of cryptographic key material that is stored on parts of the system with better protection, for example, read-only memories within the AI processor chip. In certain embodiments, different key material is used to secure the firmware, on the one hand, and the module decryption key, on the other hand. It is therefore possible for a key for protecting the module decryption key to be able to be used without change if a firmware update has been performed, for example, or, vice versa, for keys to be able to be recalled or renewed without influencing the firmware.

In accordance with an embodiment, the cryptographic module key pair having the cryptographic module decryption key and a cryptographic module encryption key is generated by the module manufacturer unit. For this purpose, use is preferably made of asymmetrical cryptographic methods for generating key pairs comprising private and public keys, for example, RSA methods or methods based on elliptical curves.

In accordance with an embodiment, an AI development unit generates the cryptographic AI key pair having the cryptographic AI decryption key and a cryptographic AI encryption key and secures the AI data set with the cryptographic AI encryption key. Methods for generating asymmetrical key pairs are preferably used again.

In accordance with a still further embodiment, the AI module is provided with the AI data set secured with the cryptographic AI encryption key. For example, this is implemented by this data set being made available to an end user of the industrial controller and/or the AI module, for example, via an app store that is hosted in a cloud server and can be used by the user to purchase the AI application. The AI data set may also be made available to the AI module directly, for example, by the encrypted AI data set being transmitted, in the exchange with the module encryption key, to the development environment of the AI module. This development environment may then store the encrypted AI data set in a memory, for example an SD card of the AI module.

In accordance with another embodiment, the AI development unit is provided with the cryptographic module encryption key for securing the cryptographic AI decryption key by the module manufacturer unit. The AI module manufacturer preferably shares the module encryption key with those AI application developers who are intended to be enabled to provide AI applications for the devices from the AI module manufacturer, who is not necessarily, however, also the manufacturer of the industrial controller, for example.

In accordance with a further embodiment, a set-up unit of the industrial controller is provided with a cryptographic AI decryption key of the cryptographic AI key pair, which is secured with the cryptographic module encryption key, by the AI development unit. For example, the set-up unit is an engineering tool or a configuration environment or a programming environment in order to create the automation program for the controller. For example, the TIA portal from Siemens is used. The set-up unit is furthermore also used to set up the AI module, in particular to configure it, and to distribute software and applications to it.

In accordance with another embodiment, the set-up unit of the industrial controller provides an automation program for controlling the industrial control device, including the execution of programs on the AI module. For example, the set-up unit distributes the automation program to the industrial controller and also at the same time the secured cryptographic AI decryption key. In other embodiments, the key may also be loaded onto the controller at a later time.

The secured cryptographic AI decryption key can be stored on the industrial control device in various ways. For example, it is distributed and stored independently of the control program. A key update, for example, on account of an update of an AI application, can therefore be advantageously carried out without having to change the control program code.

For example, the secured cryptographic AI decryption key is distributed and received via standardized communication interfaces of controllers or PLCs, for example, via OPC-UA or TCP/IP communication modules or via parameters for activating/deactivating functions of the AI module, so-called parameter record data objects.

The secured cryptographic AI decryption key is also imported, for example, via a certificate manager that is preferably available anyway on the set-up unit of the industrial control device for the management of further keys or certificates. The secured cryptographic AI decryption key is then assigned to the industrial control device via said certificate manager.

It is also possible to write the secured cryptographic AI decryption key to the controller by means of a separate system, for example, an industrial PC, to which the industrial control device is connected via an automation network, using common communication interfaces and protocols.

In particularly critical security environments, additional protection for securely transmitting and storing the secured cryptographic AI decryption key may also be provided.

However, the practice of securing the cryptographic AI decryption key based on the encryption using the module encryption key ensures anyway that the AI data set cannot yet be decrypted even with knowledge of the secured cryptographic AI decryption key.

In accordance with a further embodiment, the cryptographic module key pair is generated specifically for hardware of the AI module. This advantageously prevents memory content of an AI module from being copied to a further AI module upon which execution is not intended to be possible or is intended to be possible only after payment of the purchase price, for example.

In accordance with one embodiment, the module manufacturer unit generates a signature key pair having a public signature key and a private signature key and provides the AI module with the public signature key. The module decryption key, on the one hand, and the public signature key, on the other hand, are therefore stored on the AI module. The private signature key is not shared at any time, but rather is available, preferably in secured form, to the AI module manufacturer.

A hardware characteristic is created by the module manufacturer unit as a module fingerprint data set and is signed with the private signature key and is made available to the AI development unit as a signed module-specific token. The hardware characteristic may be a device fingerprint that is generated in the production phase of the AI module. For example, the hardware characteristic includes values of a MAC address of network interfaces or characterizing and individual or unique properties of the processors of the AI module or specific values stored for this purpose in a one-time-programmable memory section. For example, hash values of one or more of the values mentioned are used to form the hardware characteristic. Signing with the private signature key makes it possible to check the integrity and authenticity of the device fingerprint data set.

Like the AI decryption key, the token is preferably made available to the industrial control device, via its set-up unit, by the AI development unit. The controller then provides the AI module, in particular the AI processor, with the token at runtime. The AI module likewise independently determines the module fingerprint data set based on the hardware characteristics available on the AI module. The public key can be used to check whether the token was generated by the AI module manufacturer. It is also possible to check whether the transmitted device fingerprint data set is unchanged or corresponds to the self-created data set. Only then is the execution of the AI data set allowed.

A standard module decryption key can therefore be advantageously used and the AI data set is coupled to specific hardware independently of the encryption and decryption of the AI decryption key by checking the module-specific token.

In accordance with a still further embodiment, the set-up unit of the industrial controller is provided with bundle comprising the cryptographic AI decryption key of the cryptographic AI key pair and the signed module-specific token, where the bundle is secured with the cryptographic module encryption key, by the AI development unit. This prevents unauthorized access to the token and at the same time does not cause any additional effort on the part of the AI developer.

The objects and advantages in accordance with the invention are also achieved by an AI module for executing an industrial automation program using an AI data set, where the AI module includes a communication interface to an industrial controller for receiving executable automation program code and a cryptographic AI decryption key of a cryptographic AI key pair, which is secured with a cryptographic module encryption key of a cryptographic module key pair, a non-volatile memory having stored executable firmware code and a cryptographic module decryption key of the cryptographic module key pair, a module memory having an AI data set secured using a cryptographic AI encryption key of the cryptographic AI key pair, a main memory for loading the executable firmware code, and an AI processor for decrypting the secured cryptographic AI decryption key using the cryptographic module decryption key and for decrypting the secured AI data set using the decrypted cryptographic AI decryption key, where main memory is also configured to load the decrypted AI data set, such that the industrial automation program can be executed on the AI module using the AI data set.

In accordance with the invention, the module manufacturer unit generates a signature key pair having a public signature key and a private signature key and provides the AI module with the public signature key, a hardware characteristic is created by the module manufacturer unit as a module fingerprint data set and is signed with the private signature key and is made available to the AI development unit as a signed module-specific token.

The module memory advantageously need not be secured in a complicated manner like the non-volatile memory, for example, because the AI data set is available only in encrypted form in the module memory.

The method and AI module in accordance with the disclosed embodiments make it possible to securely and easily use AI applications in an industrial controller in combination with an AI module. AI algorithms or AI models are advantageously protected from unauthorized access, with the result that competitive disadvantages, attacks on critical process know-how and targeted attacks on the functionality of systems, in particular by compromising the AI applications, are prevented. At the same time, the method and AI module in accordance with the disclosed embodiments enable a comprehensive and robust protection concept in typical industrial system scenarios in which a connection to a cloud server or other external communication is not provided. On the one hand, the key material is distributed accordingly for this purpose, with the result that the end customers can activate the controller and the AI module directly in the system but, on the other hand, security is ensured even if it is no longer possible for the device manufacturer and/or the application developer to check for access to memory contents or reverse engineering measures after delivery of the products.

Complicated and purely trust-based contractual regulations regarding the scope of use of AI applications on controllers with an AI module or of AI modules with controllers for executing AI applications are advantageously dispensed with.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below on the basis of exemplary embodiments with the aid of the figures, in which:

In the figures, functionally identical elements are provided with the same reference signs, unless stated otherwise.

FIG. 1 illustrates how cryptographic key material is distributed and is present in a form distributed between components and roles in connection with a system comprising an industrial controller and an AI module.

Figure 1:
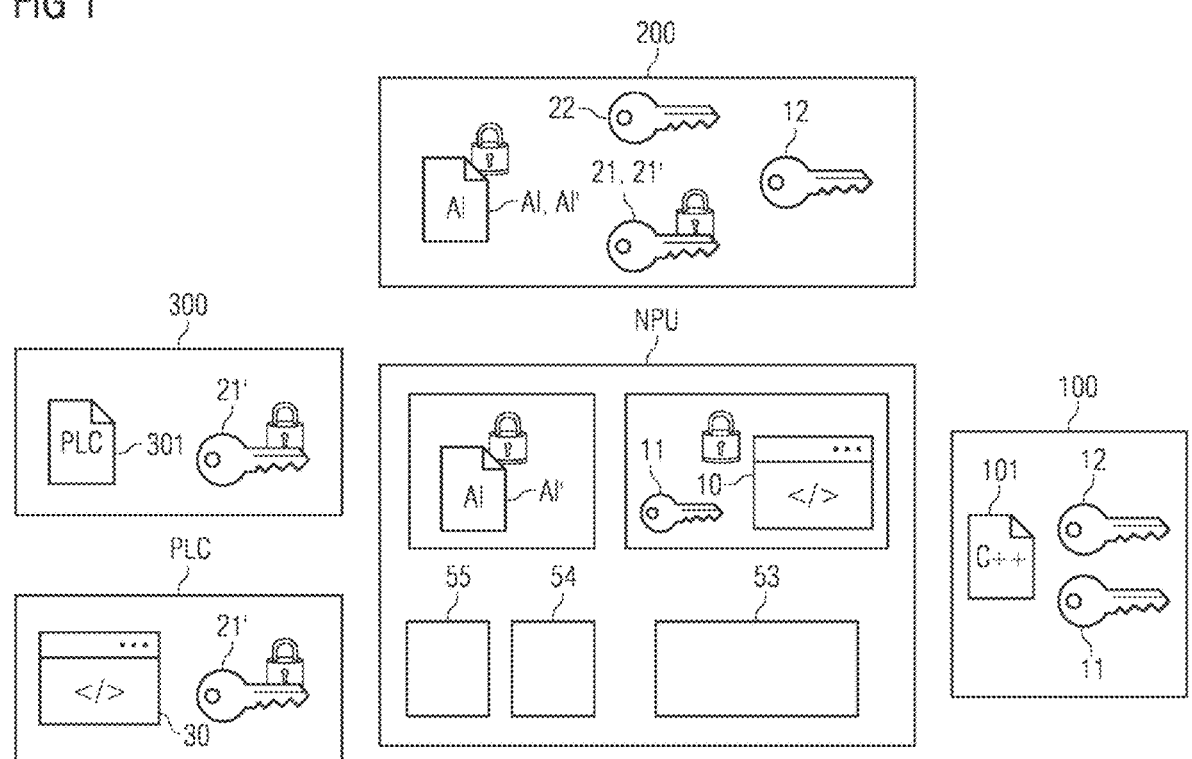
FIG. 1 shows a schematic representation for illustrating the distribution of the cryptographic key material in a system comprising an industrial control device and an AI module in accordance with a first exemplary embodiment of the invention.

An industrial control device PLC and an AI module NPU are shown. A set-up unit 300, which is, for example, a tool for setting up the industrial control device PLC using common engineering software methodologies, is also shown. The PLC program code 301 is created here and is loaded onto the control device PLC as executable automation program code 30. This is performed in an engineering phase.

Furthermore, the AI module NPU was set up in a manufacturing phase by the device manufacturer of the AI module using a module manufacturer unit that is a firmware build station, for example. This is, for example, a PC with software for creating the module firmware 101. During the manufacturing phase of the AI module NPU, this module firmware 101 is transmitted to the AI module as an executable file 10.

In addition to the role of the manufacturer of the AI module NPU with the module manufacturer unit 100 and the role of the end customer with the set-up unit 300 of the controller PLC, there is also the role of the AI application developer who creates an AI data set AI that is needed on the AI module NPU in order to be able to execute an AI application in an automation program. For example, the AI data set AI contains models which, in the case of an AI application, are taken as a basis for being able to calculate actuating signals based on the AI models using data, for example, relating to current states, which are provided via the controller PLC. The AI data set AI may also contain AI algorithms that are applied, for example, to a process image, which is received by the AI module from the controller, or parts of the image in order to calculate parameters that are used by the AI module itself or by the controller to update the process image. Furthermore, data are also delivered to the AI module, for example, from external sources, such as a camera, and/or a microphone. In particular, the controller PLC then activates the processing of the external data in the AI module.

In accordance with the first exemplary embodiment, the device manufacturer and the application developer work together to make it possible for the end customer to securely operate the controller PLC together with the AI module NPU in the automation system. For this purpose, the device manufacturer generates a cryptographic module key pair comprising a module encryption key 12 and a module decryption key 11. The device manufacturer of the AI module transmits the module encryption key 12 to the application developer using any desired, preferably secure, communication channel.

The application developer generates a cryptographic AI key pair comprising an AI encryption key 22 and an AI decryption key 21. The application developer encrypts the AI data set AI with the AI encryption key 22, for example, via cryptographic algorithms, such as asymmetrical encryption algorithms, implemented on the AI development unit 200. This AI data set is then available as a secured AI data set AI' and is passed to the outside by the AI development unit 200 only in this secured form.

The AI decryption key 21 is encrypted with the module encryption key 12, likewise using cryptographic means of the AI development unit 200.

The module decryption key 11 is stored by the module manufacturer in a secure environment during the production process in a non-volatile memory of the AI module and secure boot mechanisms are provided to protect the memory or the further use of the memory content from illegitimate reading or copying.

The foundations for securely using an industrial control component PLC in cooperation with an AI module NPU are laid with the secured storage of the module decryption key 11, the encryption of the AI decryption key 21 and the encryption of the AI data set. The encrypted AI decryption key 21' is now distributed to the control end customer who deploys it on the controller. In addition, the encrypted AI data set AI' is also stored on the AI module NPU via the control end customer. Secured communication channels are also used for this transmission if possible.

Figure 2:
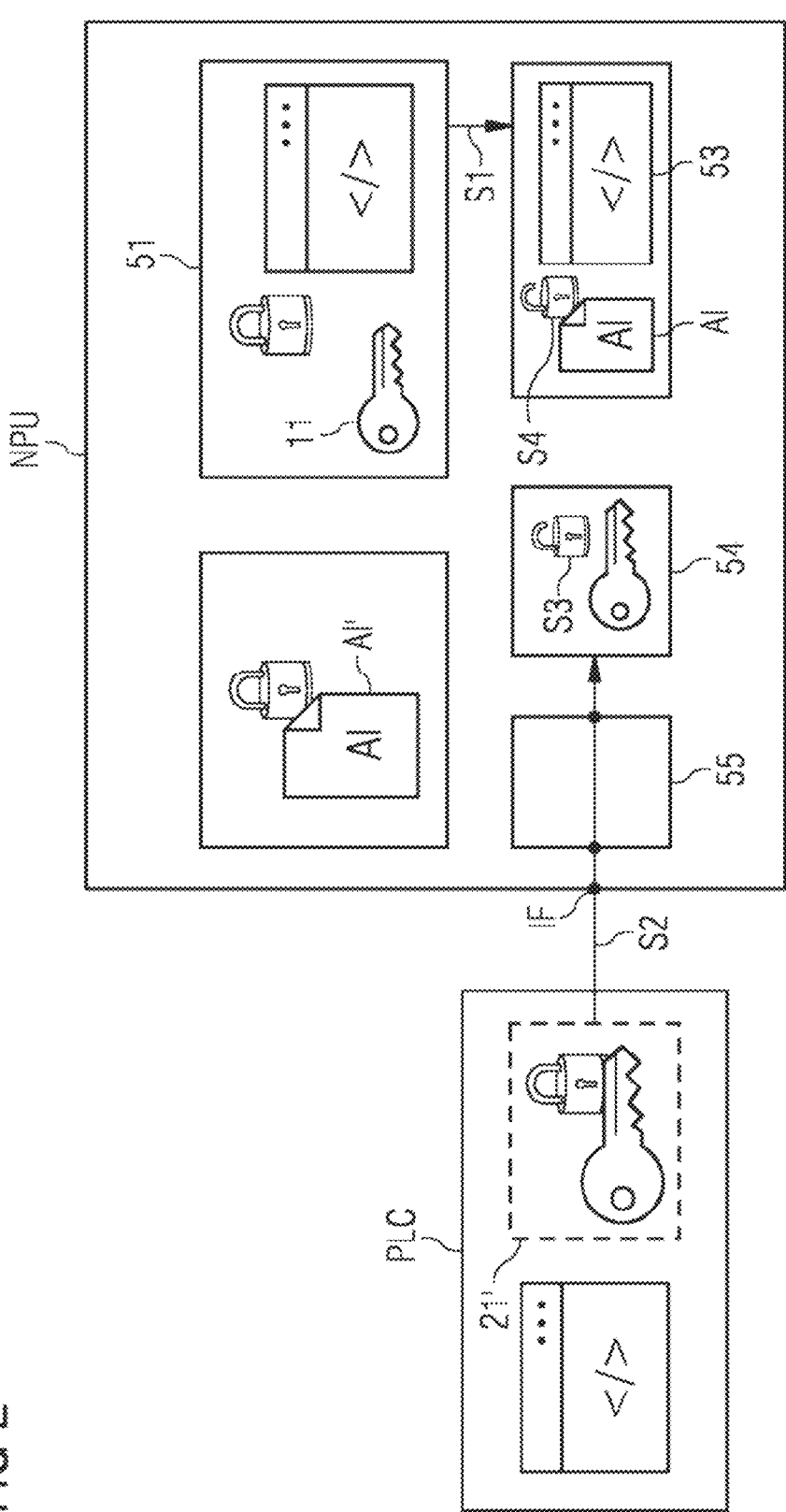
FIG. 2 shows a schematic representation of operation of an industrial control device together with an AI module in accordance with the first exemplary embodiment of the invention.

With the key material distributed and stored in this manner, the two-stage decryption method can now be used during operation of the controller. This is explained using FIG. 2.

During booting S1, the AI module reads the secure firmware from the non-volatile memory 51 and loads it onto the main memory 53 of the device, a RAM memory. For this purpose, it is possible to use secret decryption material that is stored inside the AI processor 54 (not depicted), for example, a private key with an appropriate boot mechanism in a read-only area or hardware support. In addition, the module decryption key 11 is extracted from the non-volatile memory and is preferably created in an internal SRAM memory (not illustrated).

The industrial control device PLC initiates transmission S2 of the encrypted AI decryption key 21' to the AI processor 54 via a communication interface IF and using a communication chip 55 of the AI module NPU. A network based on Profinet or generally an industrial communication protocol is used here as the transmission means, for example.

The AI processor 54 extracts the encrypted AI decryption key 21' by means of decryption S3 using the module decryption key 11 extracted from the non-volatile memory 51, with the result that the AI decryption key 21 is available for decrypting S4 the secured AI data set AI'. This decryption S4 is likewise implemented on the AI module. The decrypted AI data set AI is loaded into the main memory 53 and is used to execute the program code on the AI module.

The disclosed embodiments of the invention make it possible to couple the AI data set to the specific hardware i upon which the AI data set is intended to be able to be used.

Figure 3:
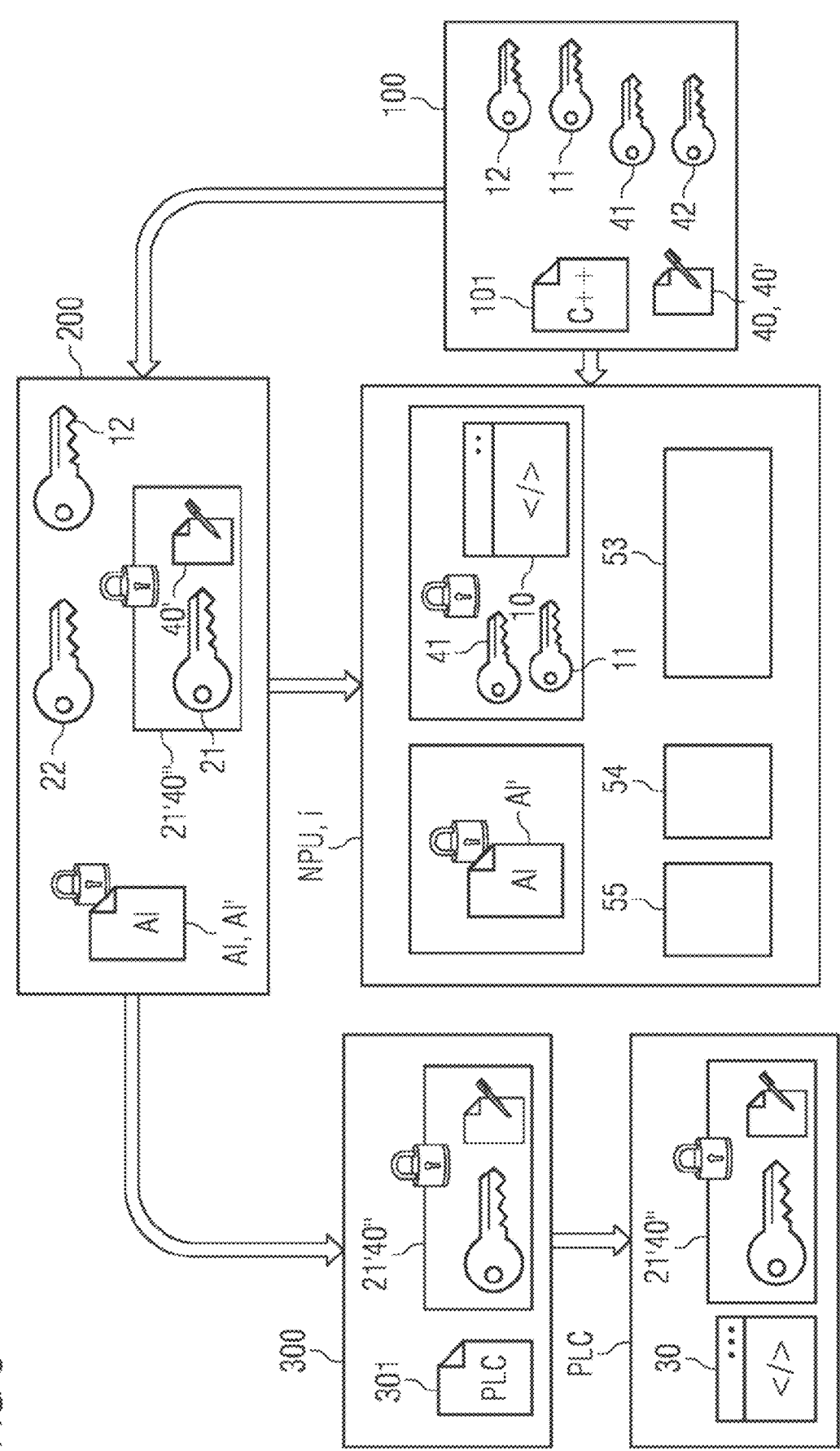
FIG. 3 shows a schematic representation for illustrating the distribution of the cryptographic key material in a system comprising an industrial control device and an AI module in accordance with a second exemplary embodiment of the invention.

This is shown using FIG. 3. For this purpose, a hardware fingerprint 40 of a specific AI module, which is characteristic of and as unique as possible for the hardware i of the subsequent AI module, is generated by the device manufacturer at the time at which the AI module is manufactured. A private signature key 42 and a public signature key 41 are also generated. A signed module-specific token 40' is created with the private signature key 42, wherein conventional cryptographic signature mechanisms are used.

Only the public signature key 41 is stored on the AI module; the private signature key 42 is kept secret.

In addition to the module encryption key 12, the signed module-specific token 40' is transmitted to the application developer. On an AI development unit 200, an application development platform or a distribution platform of the AI application developer, the signed module-specific token 40' and the AI decryption key 21 are preferably secured together with the module encryption key 12 and are distributed, as a secured bundle 21'40", to the set-up unit 300 of the industrial controller PLC.

At the runtime of the controller PLC, the latter provides the AI module NPU with the bundle 21'40" and a signature check is additionally performed. Here, the device fingerprint 40 of the AI module NPU used on the specific hardware i is determined. If it is the same hardware, then the fingerprints correspond. For the comparison, the bundle 21'40" is decrypted with the module decryption key 11, in a similar manner to the first exemplary embodiment. In addition, the fingerprint 40 is extracted from the token 40' using the public signature key 41. On the one hand, the authenticity is therefore checked, i.e., a check is performed to determine whether the signature creator corresponds to that known on the basis of the public signature key 41, and the integrity of the fingerprint 40 is also checked, i.e., its intactness and correspondence to the self-determined fingerprint 40. The AI application is executed on the AI module preferably only when the fingerprints correspond. Here, the secured AI data set AI' is decrypted and executed in a similar manner to the first exemplary embodiment.

The end customer of the controller can therefore be certain, when using the AI application in combination with the AI module, that the use of the AI application was intended for the present hardware i. This reduces the risk of using AI applications that are incompatible with the controller. The AI application developer is certain that his applications are used only with the corresponding hardware i, and the device manufacturer can also ensure that not any AI applications are executed on his hardware. The device manufacturer and the application developer can therefore implement a licensing model for their respective products. In addition, the disclosed embodiments of the method make it possible to keep the AI know-how, in particular models and algorithms, developed in a complicated manner by an application developer secret, even in scenarios in which controllers, AI modules and AI applications from different manufacturers or providers are combined.

In certain embodiments, a plurality of tokens are distributed to the application developer by the device manufacturer of the AI module in order to enable use on a plurality of different devices.

Figure 4:
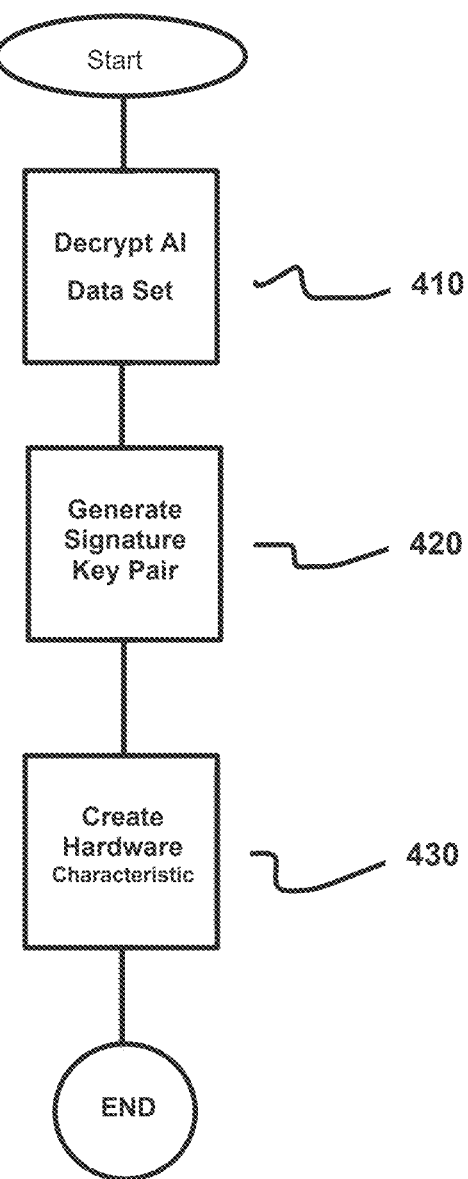
FIG. 4 is a flowchart is a flowchart of the method in accordance with the invention.

FIG. 4 is a flowchart of the method for securely operating an industrial control device PLC together with an artificial intelligence AI module NPU for processing at least one AI data set AI, in particular an artificial-intelligence-based model or an artificial-intelligence-based application. The method comprises decrypting the AI data set AI on the AI module at the runtime of the industrial control device PLC via a two stage decryption method utilizing a cryptographic module decryption key 11 of a cryptographic module key pair 11, 12 which is provided by a module manufacturer unit 100 of the AI model, and utilizing a cryptographic AI decryption key 21 of cryptographic AI key pair 21, 22 which is decrypted by via the cryptographic module decryption key 11 and which is executed in decrypted form, as indicated in step 410.

Next, the module manufacturer unit 100 generates a signature key pair 41, 42 having a public signature key 41 and a private signature key 42, providing the AI module NPU with the public signature key 41, as indicated in step 420.

Next, the module manufacturer unit 100 creates a hardware characteristic comprising a module fingerprint data set 40 and the hardware characteristic is signed with the private signature key 42, where the signed hardware characteristic is made available to the AI development unit 200 as a signed module specific token 40', as indicated in step 430.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for securely operating an industrial control device together with an artificial intelligence module for processing at least one AI data set, the method comprising:

decrypting the at least one AI data set on an AI module at runtime of the industrial control device via a two-stage decryption method utilizing a cryptographic module decryption key of a cryptographic module key pair which is provided by a module manufacturer unit of the AI model, and utilizing a cryptographic AI decryption key of a cryptographic AI key pair which is decrypted via the cryptographic module decryption key and which is executed in decrypted form;

generating, by the module manufacturer unit, a signature key pair having a public signature key and a private signature key and providing the AI module having the decrypted at least one AI data set with the public signature key; and creating, by the module manufacturer unit, a hardware characteristic comprising a module fingerprint data set and signing the hardware characteristic with the private signature key, said signed hardware characteristic being made available to an AI development unit as a signed module-specific token.

2. The method as claimed in claim 1, wherein the AI module is also provided with module firmware by the module manufacturer unit.

3. The method as claimed in claim 1, wherein at least one of the cryptographic module decryption key and firmware is stored in a non-volatile memory of the AI module.

4. The method as claimed in claim 2, wherein at least one of the cryptographic module decryption key and the firmware is stored in a non-volatile memory of the AI module.

5. The method as claimed in claim 1, wherein at least one of the cryptographic module decryption key stored in non-volatile memory and (ii) module firmware is stored in a secured manner via a trusted computing method.

6. The method as claimed in claim 5, wherein the trusted computing method comprises a secure boot method.

7. The method as claimed in claim 1, wherein the cryptographic module key pair having the cryptographic module decryption key and a cryptographic module encryption key is generated by the module manufacturer unit.

8. The method as claimed in claim 1, wherein an AI development unit generates the cryptographic AI key pair having the cryptographic AI decryption key and a cryptographic AI encryption key and secures the at least one AI data set with the cryptographic AI encryption key.

9. The method as claimed in claim 1, wherein the AI module is provided with the AI data set secured with the cryptographic AI encryption key.

10. The method as claimed in claim 1, wherein the AI development unit is provided with the cryptographic module encryption key for securing the cryptographic AI decryption key by the module manufacturer unit.

11. The method as claimed in claim 1, wherein a set-up unit of an industrial controller is provided with a cryptographic AI decryption key of the cryptographic AI key pair, which is secured with the cryptographic module encryption key, by the AI development unit.

12. The method as claimed in claim 11, wherein the set-up unit of the industrial controller provides an automation program for controlling the industrial control device, including execution of programs on the AI module.

13. The method as claimed in claim 1, wherein the cryptographic module key pair is generated specifically for hardware (i) of the AI module.

14. The method as claimed in claim 11, wherein the set-up unit of the industrial controller is provided with a bundle comprising the cryptographic AI decryption key of the cryptographic AI key pair and the signed module-specific token, said bundle being secured with the cryptographic module encryption key, by the AI development unit.

15. The method as claimed in claim 1, wherein the at least one AI data set comprises an artificial-intelligence-based model or an artificial-intelligence-based application.

16. An artificial intelligence module for executing an industrial automation program using an AI data set, the artificial intelligence module comprising:

a communication interface to an industrial controller for receiving executable automation program code and a cryptographic AI decryption key of a cryptographic AI key pair, which is secured with a cryptographic module encryption key of a cryptographic module key pair;

a non-volatile memory having stored executable firmware code and a cryptographic module decryption key of the cryptographic module key pair;

a module memory having the AI data set secured utilizing a cryptographic AI encryption key of the cryptographic AI key pair;

a main memory for loading the executable firmware code; and an AI processor for decrypting the secured cryptographic AI decryption key utilizing the cryptographic module decryption key and for decrypting the secured AI data set utilizing the decrypted cryptographic AI decryption key, the main memory also being configured to load the decrypted AI data set, such that the industrial automation program is executable on the AI module via the AI data set;

wherein the module manufacturer unit generates a signature key pair having a public signature key and a private signature key and provides the AI module with the public signature key; and wherein a hardware characteristic is created by the module manufacturer unit as a module fingerprint data set; signed with the private signature key and made available to an AI development unit as a signed module-specific token.

* * * * *